United States Patent [19]
Ando et al.

[11] Patent Number: 5,351,985
[45] Date of Patent: Oct. 4, 1994

[54] SUSPENSION SYSTEM FOR AUTOMOTIVE VEHICLES

[75] Inventors: Fumitaka Ando, Hatsukaichi; Takeshi Edahiro, Higashihiroshima; Shigefumi Hirabayashi, Hiroshima, all of Japan

[73] Assignee: Mazda Motor Corporation, Hiroshima, Japan

[21] Appl. No.: 88,638

[22] Filed: Jul. 9, 1993

[30] Foreign Application Priority Data

| Jul. 9, 1992 | [JP] | Japan | 4-207594 |
| Jul. 9, 1992 | [JP] | Japan | 4-207595 |
| Jul. 10, 1992 | [JP] | Japan | 4-207406 |
| Jul. 10, 1992 | [JP] | Japan | 4-207407 |

[51] Int. Cl.⁵ ............................................. B60G 3/20
[52] U.S. Cl. .................................... 280/675; 280/661
[58] Field of Search ................ 280/661, 673, 675, 772

[56] References Cited

U.S. PATENT DOCUMENTS

| 3,942,815 | 3/1976 | Schwenk et al. | 280/675 |
| 4,738,466 | 4/1988 | Mikina | 280/675 |
| 4,798,396 | 1/1989 | Minakawa | 280/673 |
| 5,094,472 | 3/1992 | Oyama et al. | 280/661 |

FOREIGN PATENT DOCUMENTS 3730212  3/1989  Fed. Rep. of Germany .

*Primary Examiner*—Kenneth R. Rice
*Attorney, Agent, or Firm*—Keck, Mahin & Cate

[57] ABSTRACT

A suspension system has a link mechanism, disposed between a wheel support and a car body, for suspending the wheel support from the body so as to allow a wheel, related to steering, to swing about a center axis relative to the body. The link mechanism is caused to change a height of an instantaneous center of a swing of the wheel from the ground according to degrees of turn, such as steered angles, so as to maintain a height of the instantaneous center at a substantially fixed height from the ground.

25 Claims, 15 Drawing Sheets

SUSPENSION SYSTEM FOR AUTOMOTIVE VEHICLES

BACKGROUND OF THE INVENTION

1. Field of the Invention

This invention relates to a suspension system for an automotive vehicle, and, more particularly, to an automotive vehicle suspension system for wheels related to steering.

2. Description of Related Art

While a vehicle turns around a corner, the vehicle body is subjected to a centrifugal force. Because a center of rolling of the vehicle body is generally placed below the center of gravity of the vehicle body at which the centrifugal force acts on the vehicle body, the centrifugal force serves as a rolling moment which takes the distance between the center of gravity and the center of rolling as a lever length. Consequently, a suspension link mechanism between the vehicle body and a wheel driving in an outside path during a turn allows the outside wheel to bump so as to cause the vehicle body to move in close to the outside wheel.

On the other hand, while the vehicle is accelerating, braking or turning, a straightly advancing or propulsive force is applied to the vehicle body at the center of gravity. However, since the instantaneous center of swing of a wheel is generally placed below the center of gravity at which the straightly advancing or propulsive force acts on the vehicle body, the straightly advancing or propulsive force produces a pitching moment proportional to the distance between the center of gravity of the vehicle body and the instantaneous center of swing of the wheel. Consequently, due to the pitching moment, the vehicle is caused to squat during accelerating and to nose dive during braking, and to diagonal roll during a turn.

Reference is made to FIGS. 1 and 2 for the purpose of providing a brief introductory explanation, an instantaneous center of swing P1 of a front wheel 100 (which will be hereafter referred to as a front wheel instantaneous center for simplicity) is defined as a point of intersection of extended lines of upper and lower trailing link levers 101 and 102 of a front wheel suspension link mechanism when viewing the car from the side, and an instantaneous center P2 of a rear wheel 103 (which will be hereafter referred to as a rear wheel instantaneous center) is similarly defined as a point of intersection of extended lines of upper and lower trailing link levers 104 and 105 of a rear wheel suspension link mechanism when viewing the car from the side. The front wheel suspension link mechanism rules its anti-diving property depending upon the ratio of the height (H1) of the front wheel instantaneous center P1 from the ground to the distance, or length, (L1) between the center of the front wheel and the front wheel instantaneous center P1. Further, the front wheel suspension link mechanism rules its anti-squat property depending upon the ratio of the height (H2) of the rear wheel instantaneous center P2 from the ground to the distance, or length, (L2) between the center of the front wheel and the front wheel instantaneous center P2. It is apparent that an increase in the height (H1) of the front wheel instantaneous center P1 and an increase in the height (H2) of the rear wheel instantaneous center P2 provides an enhanced anti-dive property of the vehicle and an enhanced anti-squat property of the vehicle, respectively.

In order to improve the turning property of the vehicle by making a camber, or a camber angle, of a front wheel in the outside path with respect to the ground while turning as small as possible to zero, utilization is made of a suspension geometry that provides a change in camber of a front wheel in the outside path relative to the vehicle body, caused due to bumps of the front wheel, so that the change declines toward negative camber. On the other hand, a caster trail is increased according to degrees of outward bump in order to increase a self-aligning torque, and a caster angle is increased in order to improve driving or handling qualities and enhance the tendency of under steering.

As shown in FIG. 2, when the front wheel bumps as shown by double dotted line, the caster angle, i.e. the inclination of a king pin, and a caster trail Ct are increased and simultaneously, the front wheel instantaneous center is displaced or pulled down to a point P1A from a point P1. This downward displacement of the front wheel instantaneous center P1 of the front wheel 100 deteriorates the properties of anti-diagonal rolling and anti-diving of the vehicle. As apparent from the above description, in order for the vehicle to improve the performance of turning, the suspension geometry has to realize simultaneously the camber property during rolling and the caster property during pitching.

One example of such a front wheel suspension link mechanism, having upper and lower lateral link levers, is known from, for instance, West Germany Laid Open Patent Publication DE3730212. This front wheel suspension link mechanism described in this publication includes an adjusting means to lift up a linking point of the lower lateral link lever to a vehicle body when the vehicle body bumps. With the front wheel suspension link mechanism, since the linking point of the lower lateral link lever is lifted up by means of outside bumps caused during a turn, the depression of the center of rolling of the vehicle body during a turn is declined so as to provide an improved turning performance of the vehicle.

However, because the conventional front wheel suspensions are designed and adapted to increase the caster trail and caster angle of a front wheel according to outside bumps during a turn, a decrease in vertical position of the instantaneous center of a front wheel in the outside path is unavoidably caused according to degrees of turn, namely turning radii or steered angles of a steering wheel, so as to increase a pitching moment which leads to an enhancement of diagonal rolling of the vehicle. For this reason, it may be possible to increase the angle of inclination of the trailing link lever of the front suspension link mechanism so as to place the front wheel instantaneous center in a higher position from the ground. However, if the trailing link lever is inclined at a large angle, it allows the vehicle body to be greatly sensitive to the road surface. This leads to deteriorated ride qualities or comfort and the difficulty of establishing a desirable property of caster. Further, although the stability of vehicle attitude, which depends upon the property of anti-diagonal rolling and anti-diving of the vehicle body, is considerably improved, however, a caster angle is not allowed to be large, so as to provide a strong tendency of over-steering during a turn which in turn leads to a deteriorated stability of driving or handling.

The suspension system described in the above-mentioned publication is structured with an intention of lifting up the center of rolling of the vehicle body and does not control pitching of the vehicle body during bumps. In particular, this suspension system acts in the same or similar manner responding to bumps due to both turning and unevenness of the road surface during straight ahead driving, so as to loose the stability of straight ahead driving due to a sharp change in camber to the ground which is caused by unevenness of the road surface during a turn.

SUMMARY OF THE INVENTION

It is therefore an object of the present invention to provide a suspension system which can decline pitching during a turn.

It is another object of the present invention to provide a suspension system which can improve the stability of vehicle attitude in a range of small degrees of turn and provide a large caster angle in a range of large degrees of turn.

It is still another object of the present invention to provide a suspension system which can provide a large caster angle in a range of large degrees of turn even when the suspension system has a suspension geometry for a greatly improved stability of attitude, such as the property of anti-diving, of a vehicle.

The foregoing objects of the present invention is accomplished by providing a suspension system having a link mechanism for a wheel, related to a steering system of an automobile, which is supported for rotation by a wheel support member. The link mechanism, which is disposed between the wheel support and a vehicle body, suspends the wheel support from the vehicle body so as to allow the axle of the wheel to swing about a center axis relative to the vehicle body. The link mechanism is caused by an actuating means, such as an electric motor, to change a height of an instantaneous center of a swing of the wheel or the wheel axle from the ground according to degrees of turn of the automobile, such as radii of turn or steered angles, so as to maintain a height of the instantaneous center axis of swing at a substantially fixed height from the ground. If the suspension geometry places the instantaneous center axis of swing at a high point from the ground in a static state, the adjusting means causes the link mechanism to displace downward the instantaneous center axis of swing for a wheel in an outside path and upward the instantaneous center axis of swing for a wheel in an inside path while the wheels turn around a corner. If the suspension geometry places the instantaneous center axis of swing at a low point from the ground in the static state, the adjusting means causes the link mechanism to displace upward the instantaneous center axis of swing for a wheel in an outside path and downward the instantaneous center axis of swing for a wheel in an inside path while the wheels turn around a corner. In this instance, the static state shall mean such a state that a steering wheel is operated or turned while the vehicle is stopping.

The degree of turn may be represented in various forms, such as a steering angle, a lateral acceleration of a vehicle, and a combination of a steering angle and a vehicle speed.

Because the suspension link mechanism is adjusted to change the heights of instantaneous swing centers of wheels, which are related to steering, according to degrees of turn, an optimum suspension geometry is realized during a turn.

If the suspension geometry is sized so as to provide a large caster angle during a turn while keeping the stability of straight ahead driving at high speeds, the instantaneous center of a wheel in the outside path, which is placed at a low point, is displaced upward during a turn and consequently, a pitching moment is increased. Diagonal rolling of a vehicle becomes amplified with an increase in pitching moment, so as to deteriorate the property of anti-diving and the property of anti-squat. However, with the suspension system according to the present invention, the instantaneous center of a wheel in the outside path is displaced according to degrees of turn, such as steering angles, an increase in pitching moment in a direction of diving, which is caused due to a centrifugal force, is declined, so as to decrease diagonal rolling, thereby improving the property of anti-diving and the property of anti-squat. This improves ride qualities and secures driving qualities while turning with, in particular, marginal turning radii.

On the other hand, if the suspension geometry is sized so as to provide an improved property of anti-diving in order to obtain the stability of attitude of vehicle body, the instantaneous center of a wheel in the outside path, which is placed at a high point, is displaced downward during a turn, so as to provide a large caster angle during a turn. Consequently, The stability of driving during a turn is improved while keeping the stability of vehicle attitude during straight ahead driving.

BRIEF DESCRIPTION OF THE DRAWINGS

The above and other objects and features of the present invention will be clearly understood from the following detailed description with respect to preferred embodiments thereof when considered in conjunction with the accompanying drawings, in which the same reference numerals have been used to denote the same or similar parts or elements throughout the drawings, and wherein.

DETAILED DESCRIPTION OF THE PREFERRED EMBODIMENT

Figure 1:
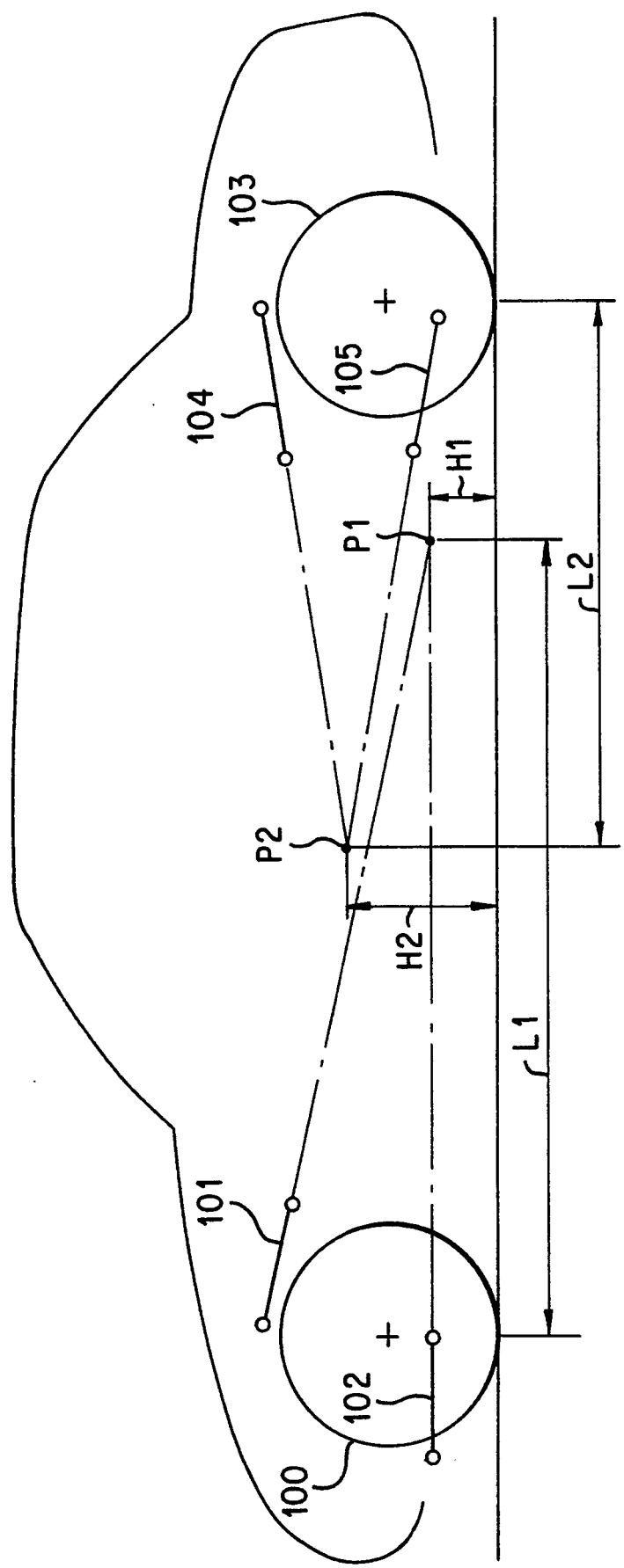
FIG. 1 is a schematic illustration showing front and rear wheel instantaneous centers.
Figure 2:
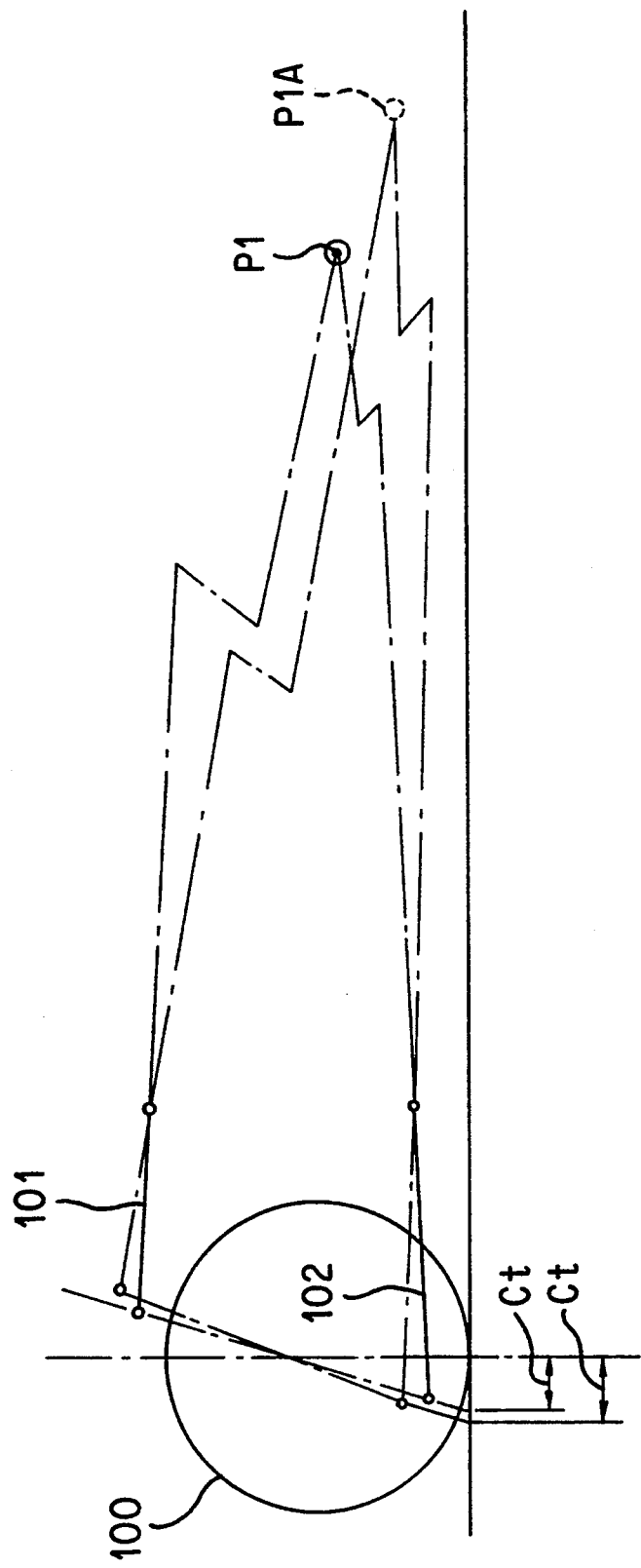
FIG. 2 is a schematic illustration showing a motion of a front wheel instantaneous center.

Because suspension systems and steering systems are well known, the present description will be directed in particular to elements forming part of, or cooperating directly with, a suspension link mechanism of the suspension system in accordance with the present invention. It is to be understood that parts or elements not specifically shown or described can take various forms well known to those skilled in the automobile art.

The term "instantaneous center" as used herein shall mean and refer to the center of instantaneous swing when viewing the car from the side.

For clarity, only a suspension system for a wheel, which takes an outside path of turn, has been shown, although it is to be understood that motions of a wheel, which takes an inside path of turn appears in reverse with respect to those of the outside wheel.

Referring to the drawings in detail, and in particular, to FIGS. 3 through 17, various types of link mechanisms of a suspension system in accordance with a preferred embodiment of the present invention, in which an instantaneous centers of steering-related wheels, for instance front wheels, are established in lower positions from the ground, are shown.

Figure 3:
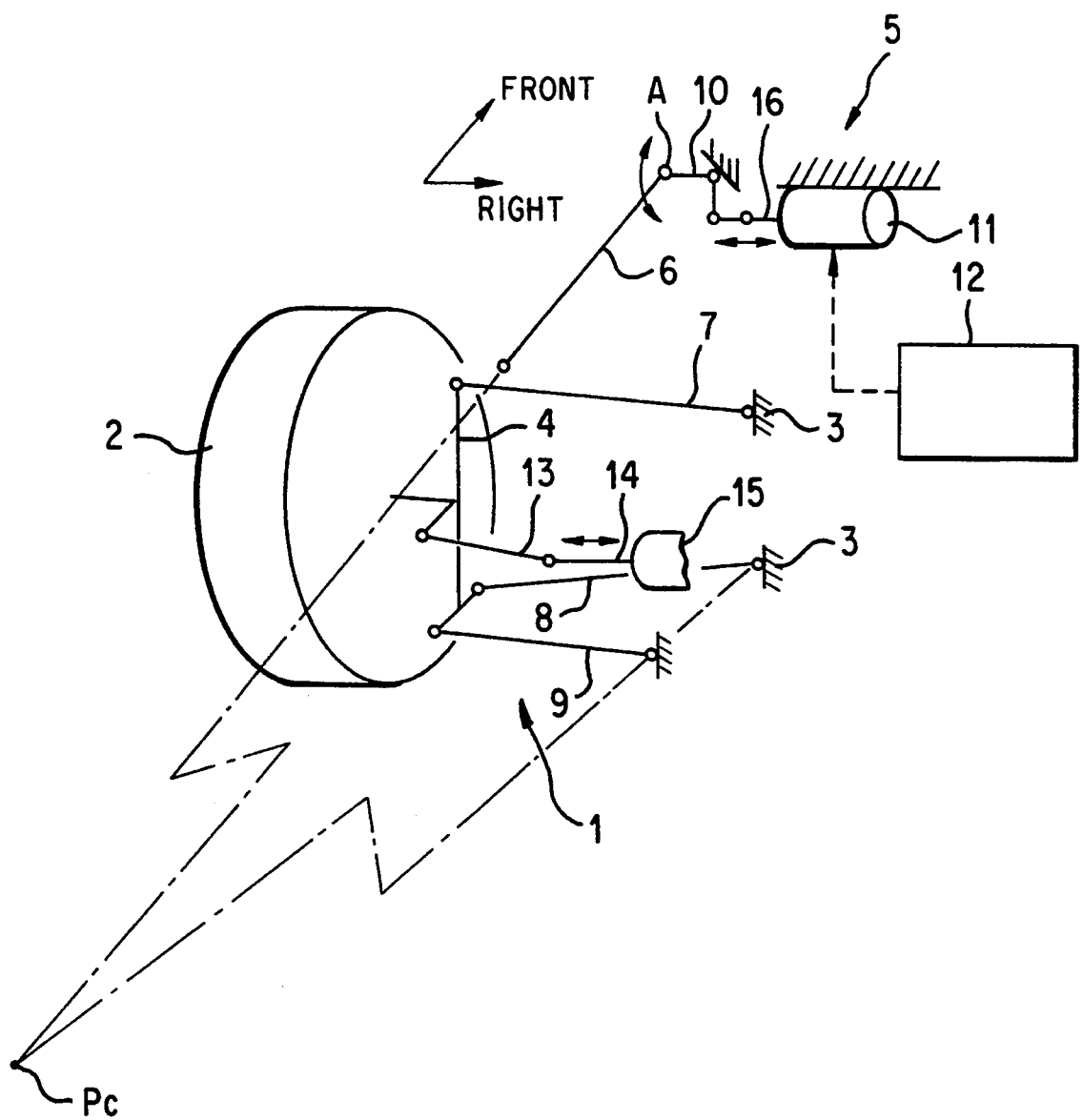
FIG. 3 is a schematic illustration of a suspension link mechanism of a suspension system in accordance with a preferred embodiment of the present invention.
Figure 4:
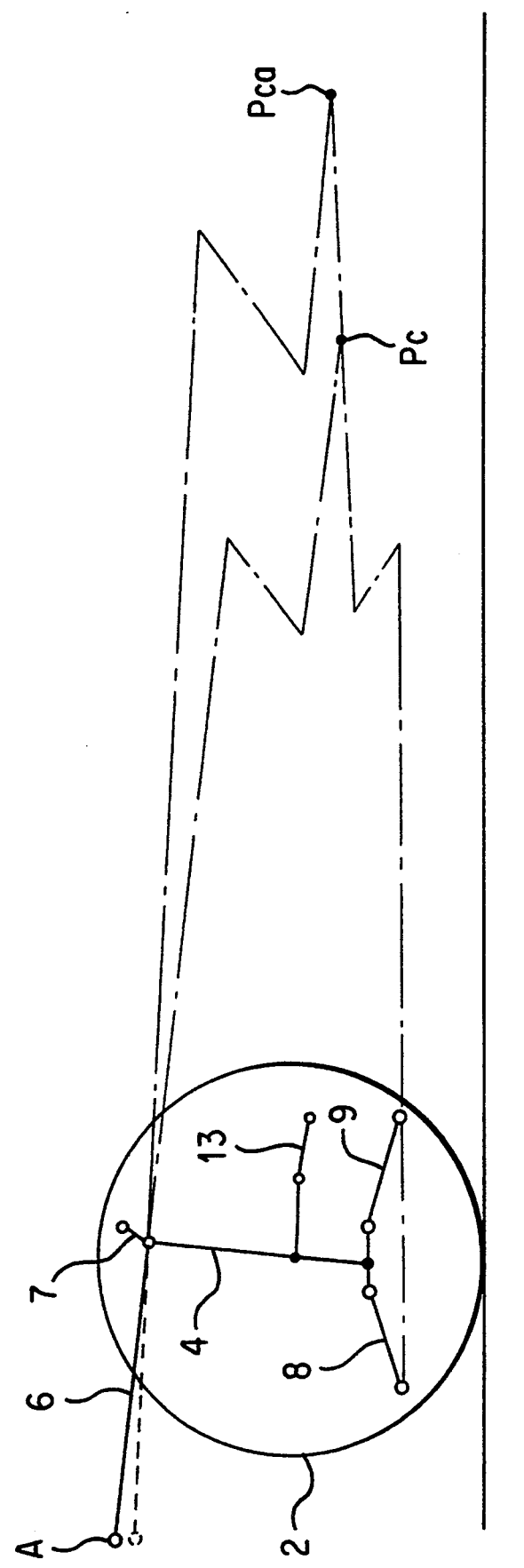
FIG. 4 is a schematic illustration showing a motion of the instantaneous center of a wheel related to steering.
Figure 5:
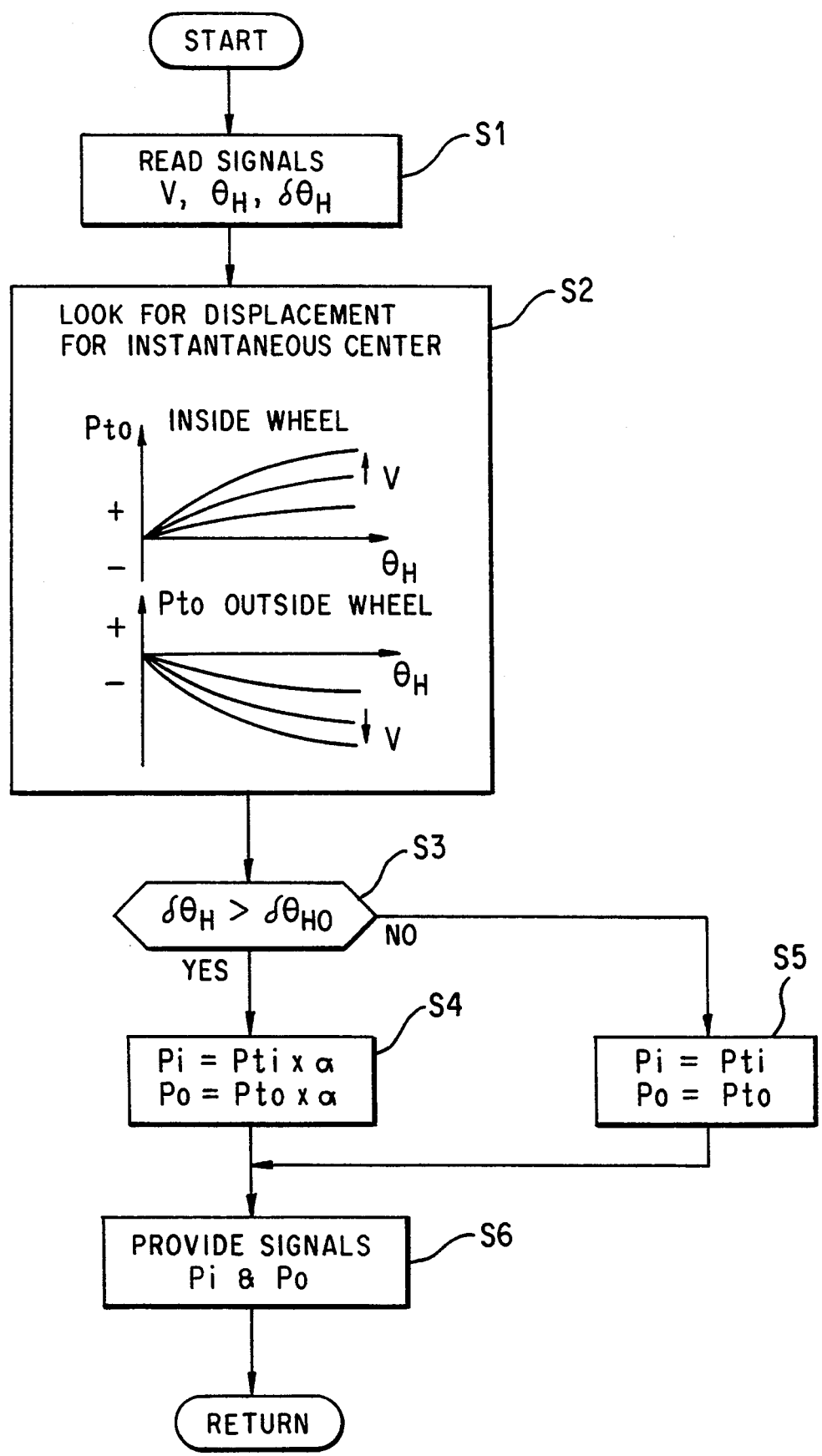
FIG. 5 is a flow chart illustrating the instantaneous center height adjusting control routine.

Referring to FIGS. 3 to 5, a suspension system has a suspension link mechanism 1 for connecting a wheel, for instance a left front wheel 2, to a body 3 of an automotive vehicle and an adjusting means 5 for shifting an instantaneous center Pc of the front wheel 2 according to steering angles. This suspension link mechanism 1 includes upper trailing link 6 and upper lateral link lever 7, both of which are connected to an upper end of a wheel support member 4. The upper trailing link lever 6 extends forward in a lengthwise direction of the vehicle body 3 from the wheel support member 4, and the other, i.e. the upper trailing link lever 7, extends transversely inward from the wheel support member 4. Further, the suspension link mechanism 1 includes a pair of lower lateral link levers 8 and 9, connected to a lower end of the wheel support member 4, which are separated in the lengthwise direction of the vehicle body 3 and extend transversely inward. Inner ends of the upper and lower lateral link levers 7, 8 and 9 are connected directly to the vehicle body 3. However, the forward end of the upper trailing link lever 6 is bent inward and connected to an L-shaped bell crank lever 10 supported for rotation by the vehicle body 3. The wheel support member 4 is connected with a steering link 14, assisted by means of a power cylinder 15, through a tie rod 13.

The adjusting means 5 includes an actuator 11, such as an electric motor. The adjusting means 5, which has an output shaft 16 connected to one end of the bell crank lever 10 remote from the upper trailing link lever 6, operates to swing the bell crank lever 10 so as to move up and down the upper trailing link lever 6 at the forward linking point A in opposite directions. The adjusting means 5 has a control means 12, such as a micro-computer, for causing the actuator 11 to operate according to rudder angles or steered angles of a steering wheel (not shown).

In the suspension link mechanism 1 structured described above, various design factors have been established so as to provide a front wheel camber to the ground of zero while the vehicle is traveling, the height of the center of rolling which realizes a smallest change in the front wheel camber to the vehicle body for ordinary bumps caused while the vehicle is traveling, and the height of an instantaneous center of the front wheel which is suppressed not so high from the ground for a large caster angle upon bumps when the wheels turn around a corner, stabilized driving qualities while the vehicle is traveling straight on, and ride qualities.

Referring to FIG. 5, which is a flow chart illustrating an instantaneous center height adjusting control routine for the micro-computer of the control means 12, the flow chart logic commences and control passes directly to step S1 where various control factors are read in. The factors read at this step S1 are a vehicle speed (V) detected by a speed sensor (not shown), a steering angle ($\Theta_H$) through which a steering wheel is operated and which is detected by an angle sensor (not shown), and a rate of steering angle change ($\delta\Theta_H$) which is obtained as a differential value of the steering angle ($\Theta_H$).

Subsequently, at step S2, a vertical displacement (Pto) of the forward linking point A of the upper trailing link lever 6 is looked up in a displacement map according to the steering angle ($\Theta_H$). This displacement map, which is established with vehicle speeds as a parameter, is different between when the front wheel 2 takes an outside path and when it takes an inside path. Specifically, the displacement map for the inside path is established such that, with an increase in steering angle ($\Theta_H$) and with an increase in vehicle speed (V), the vertical displacement (Pto) of the forward linking point A of the upper trailing link lever 6 is positively increased, that is, the upper trailing link lever 6 is lifted up at the forward linking point A. On the other hand, the displacement map for the outside path is established such that, with an increase in steering angle ($\Theta_H$) and with an increase in vehicle speed (V), the vertical displacement (Pto) of the forward linking point A of the upper trailing link lever 6 is negatively increased, that is, the upper trailing link lever 6 is pulled down at the forward linking point A. This is because, the instantaneous center Pc of the front wheel is determined as the point of intersection of the extension of the upper trailing link lever 6 and the extension of a line passing through points at which the lower lateral link levers 8 and 9 are connected to the vehicle body 3, and, as previously explained with respect to the prior art shown in FIG. 1, when the front wheel 2 in the outside path is subjected to bump while the wheels turn around a corner, the instantaneous center Pc of the front wheel 2 is pulled down with respect to the instantaneous center Pc of the front wheel 2 while the wheels travel straight ahead on without any bump. This pull down of the instantaneous center Pc of the front wheel 2 provides an increase in rolling moment and pitching moment which is attributable to centrifugal force and the like caused while cornering, so as to produce diagonal rolling.

For this reason, as shown in FIG. 4, if the front wheel 2 is in the outside path during a turn, intentionally displacing or pulling down of the forward linking point A of the upper trailing link lever 6 causes rise in vertical position of the instantaneous center of the front wheel 2 from Pc to Pca. Consequently, the instantaneous center Pc is suppressed in being pulled down, so as to suppress an increase in pitching moment due to centrifugal force, leading to an improvement in the properties of anti-diagonal rolling, anti-diving and anti-skidding, and hence, an improvement of driving qualities and ride qualities during turns with, in particular, marginal turning radii. On the other hand, if the front wheel 2 is in the inside path during a turn, because it generates reverse motions as compared to the outside wheel, the forward linking point A of the upper trailing link lever 6 is intentionally risen up so as to decline the upward displacement of the instantaneous center of the inside wheel 2.

In this instance, when the outside wheel bumps during a turn, the instantaneous center of the outside wheel 2 is subjected to a downward displacement. The intentional displacement of the wheel 2 is caused relative to the center of swing of the wheel when it is in the static state. Accordingly, when the vehicle is traveling, an actual displacement of the instantaneous center Pc from the center of swing in the static state is declined.

Further, the suspension link mechanism 1 does not cause any change in position of the forward linking point A of the upper trailing link lever 6 in the lengthwise direction by means of adjustment by the adjusting means 5, so as to prevent a change in caster characteristics due to bumping. Consequently, the predetermined caster characteristic that a caster angle and caster trail are increased according to bumps so as to provide a tendency of under steering is kept unchanged upon bump while the wheels turn a corner.

Another reason is that, with increases in steering angle ($\Theta_H$) and vehicle speed (V), an external force, which exerts on the vehicle body during a turn, increases proportionally to a steering angle ($\Theta_H$) and the square of a vehicle sped (V). The adjusting means 5 uses steering angle ($\Theta_H$) and vehicle sped (V) as parameters to, on one hand, pull down the forward linking point A of the upper trailing link lever 6 of the front wheel 2 in the outside path during cornering and, on the other hand, lift up the forward linking point A of the upper trailing link lever 6 of the front wheel 2 in the inside path during cornering, so as to adjust the instantaneous centers of both front wheels in the outside and inside paths at substantially the same height from the ground.

After looking up the displacement maps at step S2, a decision is made at step S3 as to whether the rate of change of the steering angle ($\delta\Theta_H$) is larger than a specific rate of change of steering angle ($\delta\Theta_{HO}$). If the answer to the decision is "NO," then, after translating the vertical displacements Ptoi and Ptoo determined for the front wheels 2 on the outside and inside, respectively, at step S2 into control signals Pti and Pto at step S5, the controller 12 provides the control signals Pti and Pto to the actuators 11 of the adjuster 5 for the left and right suspension link mechanisms 1 at step S6.

However, if the answer to the decision made at step S3 is "YES," this indicates that the rate of change of the steering angle ($\delta\Theta_H$) is larger than the specific rate in change of steering angle ($\delta\Theta_{HO}$) and consequently, a centrifugal force that the vehicle body is subjected to is larger as compared with when the rate of change of the steering angle ($\delta\Theta_H$) is smaller than the specific rate of change of steering angle ($\delta\Theta_{HO}$), then, the vertical displacements Ptoi and Ptoo determined for the front wheels 2 on the outside and inside, respectively, at step S2 are multiplied by a coefficient $\alpha$ and translated into control signals Pti and Pto at step S4. Thereafter, the controller 12 provides the control signals Pti and Pto to the actuators 11 of the adjusters 5 for the left and right suspension link mechanisms 1.

The suspension system of the present invention provides an ascent in vertical position of the instantaneous center Pc of the front wheel in the outside path during cornering with an increase in degrees of cornering, namely steering angles, it is suppressed to decrease the height in vertical position of the instantaneous center Pc of the front wheel in the outside path from the ground when the degree of cornering, i.e. a steering angle, becomes larger. Consequently, the suspension system controls diagonal rolling of the vehicle body, so as to improve anti-dive and anti-squat characteristics of the vehicle body and consequently improve operating qualities and ride comfort or quality during, in particular, sharp turns. In addition, since the adjusting means 5 operates to adjust the position of the forward linking point A of the upper trailing link lever 6 according to degrees of cornering, i.e. steering angles, and is, however, not sensitive to bumps and rebounds caused due to the uneven road surface during straight ahead driving, the stability of, in particular, high speed forward ahead driving, is kept as it has been established on suspension geometry.

Figure 6:
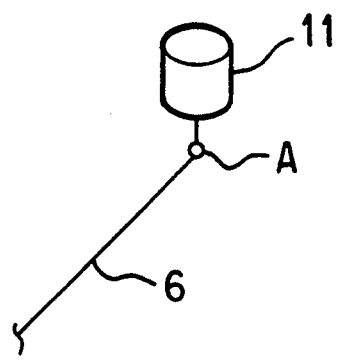
FIG. 6 is a view of a variation of an adjusting means.

The upper trailing link lever 6 may be connected at its forward end to an actuator 11 so as to be lifted up and pulled down directly by the actuator 11 as shown in FIG. 6 using any conventional or known mechanism. Further, the bell crank lever 10 may be replaced with any other connecting means to connect the forward end of the upper trailing link lever 6 to the vehicle body 3.

Figure 7:
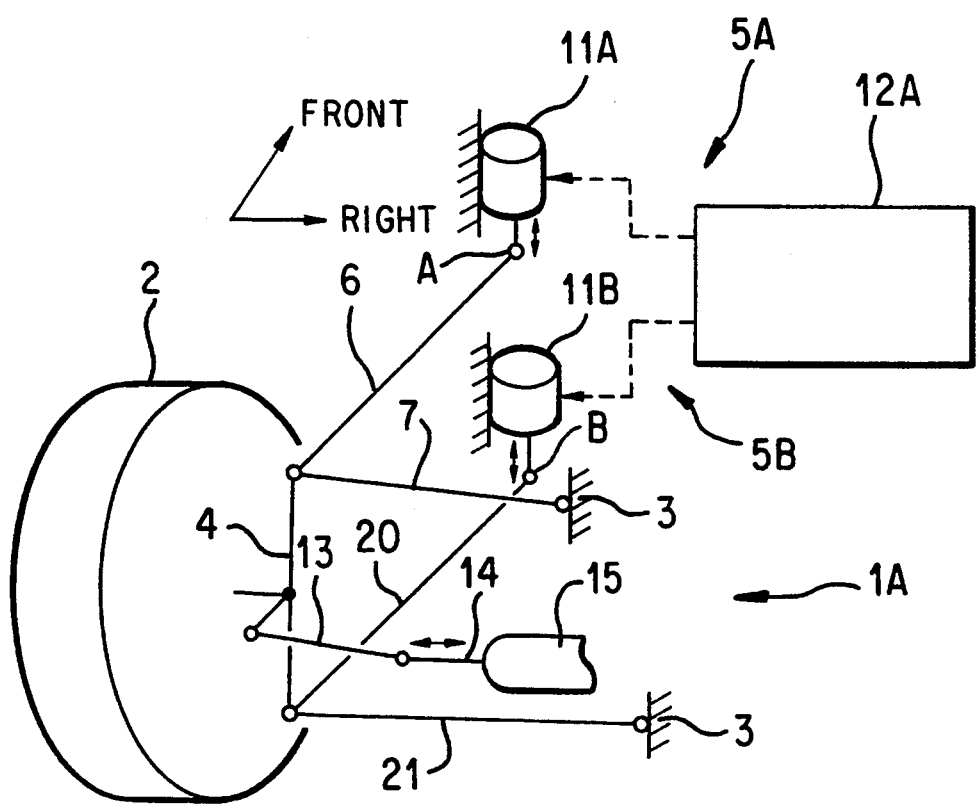
FIG. 7 is a schematic illustration of a suspension link mechanism of a suspension system in accordance with another preferred embodiment of the present invention.

Referring to FIG. 7 schematically illustrating a different type of a suspension system in accordance with the preferred embodiment of the present invention, a suspension link mechanism 1A includes upper and lower trailing link levers 6 and 20, which are connected to upper and lower ends of a wheel support member 4, respectively and extend forward, and upper and lower lateral link levers 7 and 21, which are connected to the upper and lower ends of the wheel support member 4, respectively and extend transversely inward. The wheel support member 4 is linked through a tie rod 13 to a steering link 14 assisted by a power cylinder 15. These upper and lower trailing link levers 6 and 20 are adjusted in vertical position by means of upper and lower adjusting means 5A and 5B, respectively, which include upper and lower actuators 11A and 11B controlled by a controller 12. The upper trailing link lever 6 is connected at an upper forward linking point A to the vertical output shaft 11a of an upper actuator 11A, such as an electric motor provided with any conventional or known mechanism to convert rotary motion to reciprocatory motion, secured to the vehicle body 3. Similarly, The lower trailing link lever 20 is connected at a lower forward linking point B to the vertical output shaft 11b of a lower actuator 11B, such as an electric motor provided with any conventional or known mechanism to convert rotary motion to reciprocatory motion, secured to the vehicle body 3.

The upper adjusting means 5A pulls down the upper trailing link lever 6 at the upper forward linking point A when the front wheel 2 is in the outside path and lifts up it when the front wheel 2 is on the inside path according to degrees of cornering. Similarly, the lower adjusting means 5B pulls down the lower trailing link lever 20 at the lower forward linking point B when the front wheel 2 is in the outside path and lifts up it when the front wheel 2 is in the inside path according to degrees of cornering.

By means of pulling down the upper and lower trailing link levers 6 and 20 at their forward linking points A and B according to degrees of cornering when the front wheel 2 is in the outside path, and lifting up them according to degrees of cornering when the front wheel 2 is in the inside path, descent of the instantaneous center Pc of the front wheel 2 is suppressed and the height of it from the ground is kept unchanged. Simultaneously, an increase in the lever length (which is equivalent to the distance L1 between the wheel center and the instantaneous center Pc of the front wheel 2 shown in FIG. 1) is controlled so as to be kept substantially constant.

Figure 8:
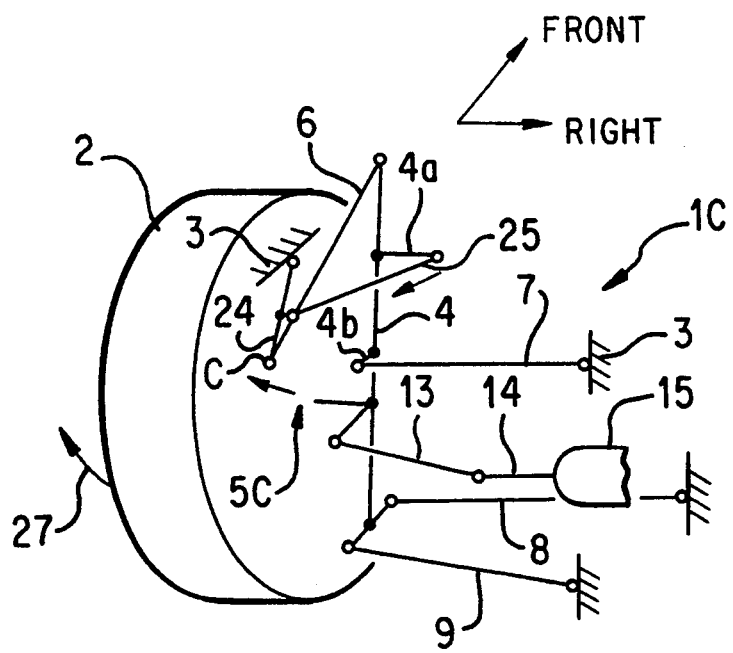
FIG. 8 is a schematic illustration of a suspension link mechanism of a suspension system in accordance with another preferred embodiment of the present invention.
Figure 9:
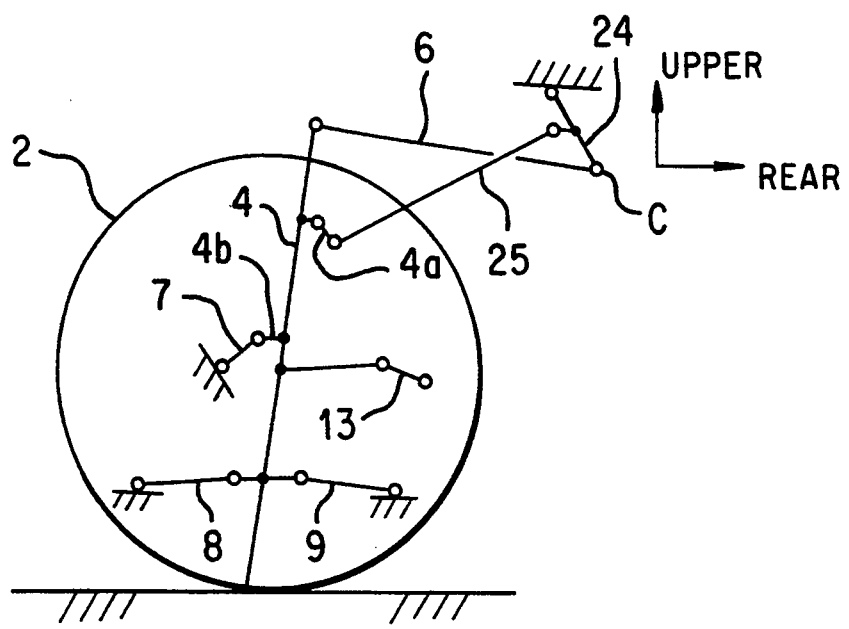
FIG. 9 is a side view of the suspension system of FIG. 8.
Figure 10:
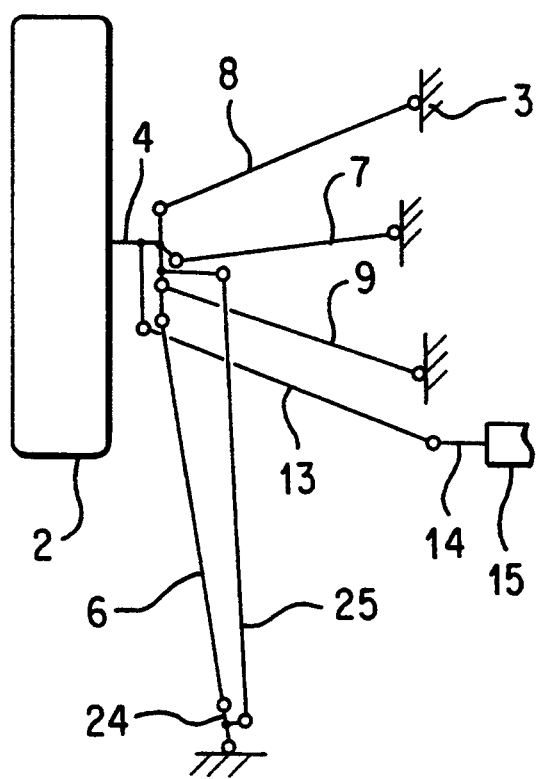
FIG. 10 is a plan view of the suspension system of FIG. 8.

Referring to FIGS. 8 through 10 schematically illustrating another type of a suspension system in accordance with the preferred embodiment of the present invention, a suspension link mechanism 1C includes various link levers, such as an upper trailing link lever 6, an upper supplemental trailing link lever 24, an upper lateral link lever 7, a pair of lower lateral link levers 8 and 9, and an assistant link lever 25. The upper trailing link lever 6 is connected to an upper end of a wheel support member 4 and extends rearward. The supplemental link lever 24, which is inclined in the vertical direction, connects the rearward end of the upper trailing link lever 6 to the vehicle body 3. The upper lateral link lever 7 is connected to an arm 4b projecting rearward from the middle of the wheel support member 4 and extends transversely inward. The lower lateral link levers 8 and 9 are connected to a lower end of the wheel support member 4 so as to be separated at a proper separation in the lengthwise direction and extend transversely inward. The assistant link lever 25 is connected at its rear end to the supplemental link lever 24 and at its front end to an arm 4a projecting transversely inward from the wheel support member 4. The wheel support member 4 is linked through a tie rod 13 to a steering link 14 assisted by a power cylinder 15. The supplemental link lever 24 and assistant link lever 25 constitute an adjusting means 5C for adjusting the rear linking point C of the upper trailing link lever 6 in vertical position according to degrees of cornering, i.e. steering angles.

This adjusting means 5C operates in such a way that, when the front wheel 2 is steered so as to turn in an outside path as shown by an arrow 27, the assistant link lever 25 displaces rearward through the arm 4a being accompanied by a rearward swing or displacement of the supplemental link lever 24, so as to lift up the rear linking point C of the supplemental link lever 24. Consequently, the instantaneous center Pco of the front wheel 2 in the outside path shifts upward. In this instance, the instantaneous center Pci of the front wheel 2 in the inside path shifts downward. This adjusting operation of the adjusting means 5C is provided when a steering wheel is turned in a static state, i.e. while the vehicle is standing. In general, when the vehicle is traveling and turns around a corner, the front wheel 2 in the outside path will be subjected to bumps according to steering angles, so as to pull down the instantaneous center Pco of the front wheel 2 in the outside path. However, when the vehicle is travelling and turning around a corner, since the adjusting means 5C controls the suspension link mechanism 1C so as to prevent the instantaneous center Pco of the front wheel 2 in the outside path from being pulled down, the instantaneous centers Pco and Pci of the front wheels 2 are practically kept at substantially constant vertical heights from the ground.

Figure 11:
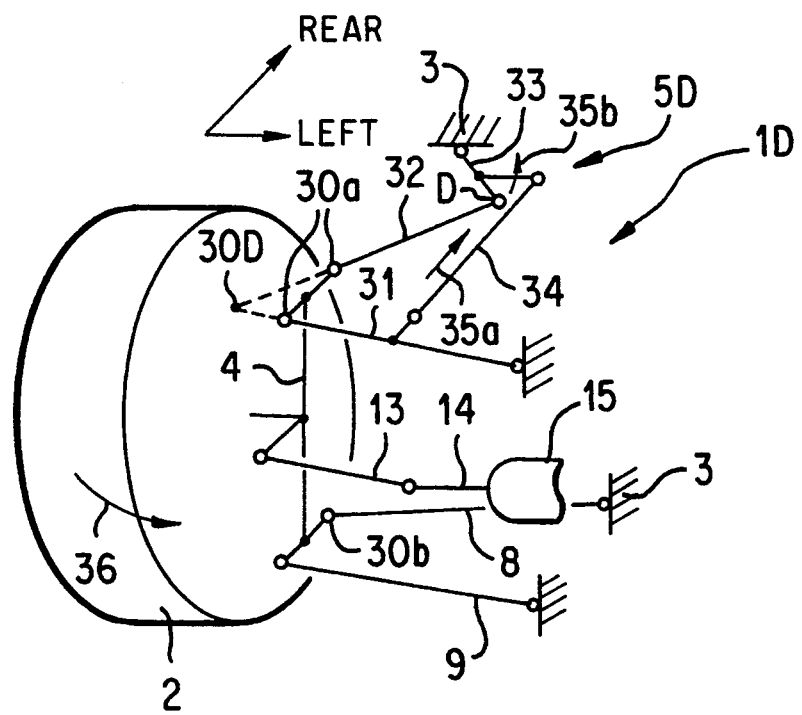
FIG. 11 is a schematic illustration of a suspension link mechanism of a suspension system in accordance with another preferred embodiment of the present invention.

Referring to FIG. 11, which is another type of a suspension system in accordance with the preferred embodiment of the present invention, the suspension link mechanism 1D includes various link levers, such as front and rear upper lateral link levers 31 and 32, a supplemental link lever 33, front and rear lower lateral link levers 8 and 9, and a control link lever 34. The front and rear upper lateral link levers 31 and 32, separated in the lengthwise direction, are connected at their outer ends to the upper end of a wheel support member 4 by means of a pivot lever 30a. The front upper lateral link lever 31 is connected at its inner end directly to the vehicle body 3. The rear upper lateral link lever 32 is further connected at its inner end D to the vehicle body 3 through a supplemental link lever 33. The front and rear lower lateral link levers 8 and 9, separated in the lengthwise direction, are connected at their outer ends to the lower end of the wheel support member 4 by means of a pivot lever 30b and at their other ends directly to the vehicle body 3. The control link lever 34 connects the supplemental link lever 33 to the front lateral link lever 31 at the mid point. The supplemental link lever 33 and control link lever 34 constitute an adjusting means 5D for adjusting the rear linking point D of the rear upper lateral link lever 32 in vertical position according to degrees of cornering, i.e. steering angles.

With this adjusting means 5D, when the front wheel 2 is steered so as to turn in an outside path as shown by an arrow 36, since the front wheel 2 in the outside path turns around the instantaneous center of rotation of the pivot arm 30D, the front upper lateral link lever 31 displaces being accompanied by a displacement of the control link lever 34 in a direction shown by an arrow 35a. Consequently, the supplemental link lever 33 swings in a counterclockwise direction as viewing from the top of the vehicle, so as to lift up the rear linking point D rearward as shown by an arrow 35b. This causes an upward displacement of the instantaneous center Pco of the front wheel 2 in the outside path. In this instance, the instantaneous center Pci of the front wheel 2 in the inside path is displaced downward. This adjusting operation of the adjusting means 5D is provided when a steering wheel is turned while the vehicle is standing. However, when the vehicle is travelling, since the adjusting means 5D controls the suspension link mechanism 1 so as to prevent the instantaneous center Pco of the front wheel 2 in the outside path from being pulled down, the instantaneous centers Pco and Pci of the front wheels 2 are practically kept at substantially constant vertical heights from the ground.

Figure 12:
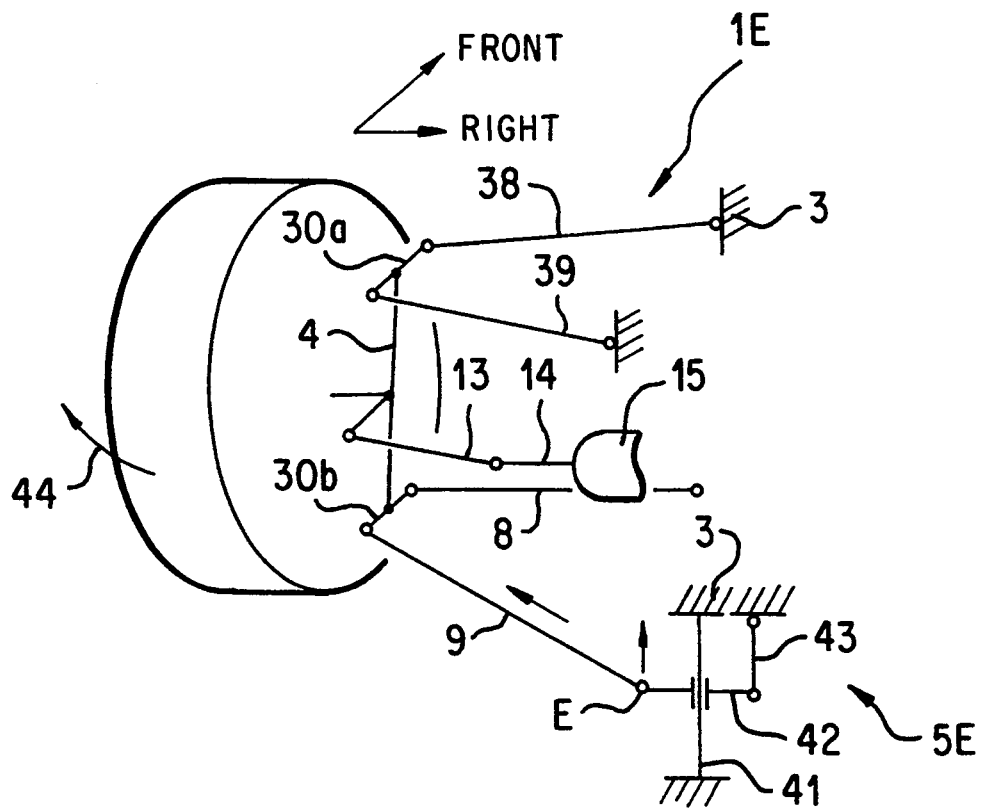
FIG. 12 is a schematic illustration of a suspension link mechanism of a suspension system in accordance with another preferred embodiment of the present invention.

Referring to FIG. 12, which shows a wish-bone type suspension system in accordance with the preferred embodiment of the present invention, a suspension link mechanism 1E includes front and rear upper lateral link levers 38 and 39 separated in the lengthwise direction, and front and rear lower lateral link levers 8 and 9 separated in the lengthwise direction. The front and rear upper lateral link levers 38 and 39 are connected at their outer ends directly to an upper end of a wheel support member 4 through an upper pivot arm 30a and at their inner ends to the vehicle body 3. Similarly, the front and rear lower lateral link levers 8 and 9 are connected at their outer ends to a lower end of the wheel support member 4 through a lower pivot arm 30b. The front lower lateral link lever 8 is connected at its other end directly to the vehicle body 3. However, the rear lower lateral link lever 9 is connected at its inner end E indirectly to the vehicle body 3 by means of an adjusting means 5E. The wheel support member 4 is linked through a tie rod 13 to a steering link 14 assisted by a power cylinder 15.

The adjusting means 5E is constituted by a vertical guide rod 41, stationary with respect to the vehicle body 3, a ring 42, mounted for sliding and turn on the guide rod 41, which is linked with the rear lower lateral link lever 9 at the rear linking point E, and a supplemental link lever 43 through which the ring 42 is connected to the vehicle body 3 so as to adjust the rear linking point E of the rear lower lateral link lever 9 in vertical position according to degrees of cornering, i.e. steering angles.

With this adjusting means 5E, when the front wheel 2 is steered so as to turn in an outside path as shown by an arrow 44, the rear lower lateral link lever 9 displaces being accompanied by turning and ascending of the ring 42 along the guide rod 41. As a result, the instantaneous center Pco of the front wheel 2 in the outside path is lifted or displaced upward. As apparent from the previous embodiments, the instantaneous center Pci of the front wheel 2 in the inside path is pulled or displaced downward. Accordingly, while the vehicle is travelling, the adjusting means 5E controls the suspension link mechanism 1E so as to prevent the instantaneous center Pco of the front wheel 2 in the outside path from being pulled down and simultaneously, to prevent the instantaneous center Pci of the front wheel 2 in the inside path from being lifted up, so that the instantaneous centers Pco and Pci of the front wheels 2 are practically kept at substantially constant vertical heights from the ground.

Figure 13:
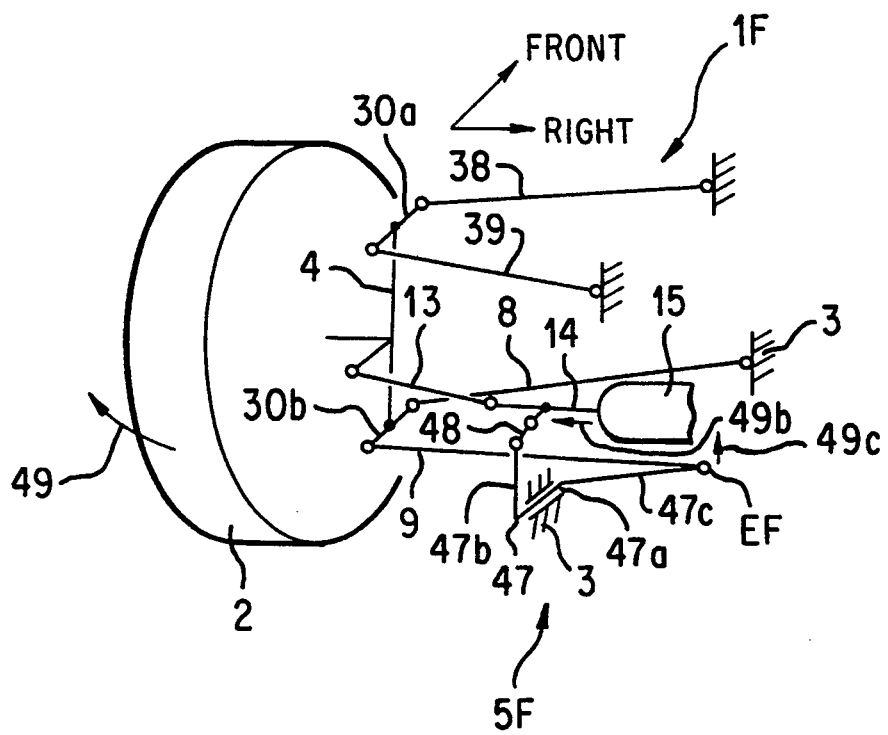
FIG. 13 is a schematic illustration of a suspension link mechanism of a suspension system in accordance with another preferred embodiment of the present invention.

Referring to FIG. 13, which shows a double wish-bone type suspension system in accordance with the preferred embodiment of the present invention, a suspension link mechanism 1F includes front and rear upper lateral link levers 38 and 39 separated in the lengthwise direction, and front and rear lower lateral link levers 8 and 9 separated in the lengthwise direction. The front and rear upper lateral link levers 38 and 39 are connected at their outer ends to an upper end of a wheel support member 4 through an upper pivot arm 30a and at their inner ends directly to the vehicle body 3. Similarly, the front and rear lower lateral link levers 8 and 9 are connected at their outer ends to a lower end of the wheel support member 4 through a lower pivot arm 30b. Similarly, the front lower lateral link lever 8 is connected at its other end directly to the vehicle body 3. However, the inner end F of the rear lower lateral link lever 9 is connected to a steering link 14 through an adjusting means 5F and is supported for substantially vertical movement by the vehicle body 3. The wheel support member 4 is linked through a tie rod 13 to the steering link 14 which cooperates with a power cylinder 15.

The adjusting means 5F is constituted by a crank lever 47, whose one end is connected to the inner end E, namely the rear linking point, of the rear lower lateral link lever 9, and a supplemental link lever 48 through which the crank lever 47 is connected to steering link 14. The crank lever 47 has a pivot shaft 47a extending in the lengthwise direction and supported for rotation by the vehicle body 3, an input arm 47b extending substantially vertically upward from the rear end of the pivot shaft 47a and connected to the rear end of the supplemental link lever 48, and an output arm 47c extending transversely inward from the front end of the pivot shaft 47a and connected to the rear linking point F of the rear lower lateral link lever 9.

With this adjusting means 5E, when the front wheel 2 is steered so as to turn in an outside path as shown by an arrow 49, the steering link 14 moves in a direction shown by an arrow 49b being accompanied by turning of the input arm 47b of the crank lever 47 in a counterclockwise direction as shown by an arrow 49c. Consequently, the rear linking point F of the rear lower lateral link lever 9 is displaced upward. However, the rear linking point F of the rear lower lateral link lever 9 for the front wheel 2 in the inside path acts in a reverse direction, i.e. it is displaced downward. This causes the adjusting means 5F to control the suspension link mechanism 1F to prevent the instantaneous center Pco of the front wheel 2 in the outside path from being pulled down and simultaneously, to prevent the instantaneous center Pci of the front wheel 2 in the inside path from being lifted up, so that the instantaneous centers Pco and Pci of the front wheels 2 are practically kept at substantially constant vertical heights from the ground.

Figure 14:
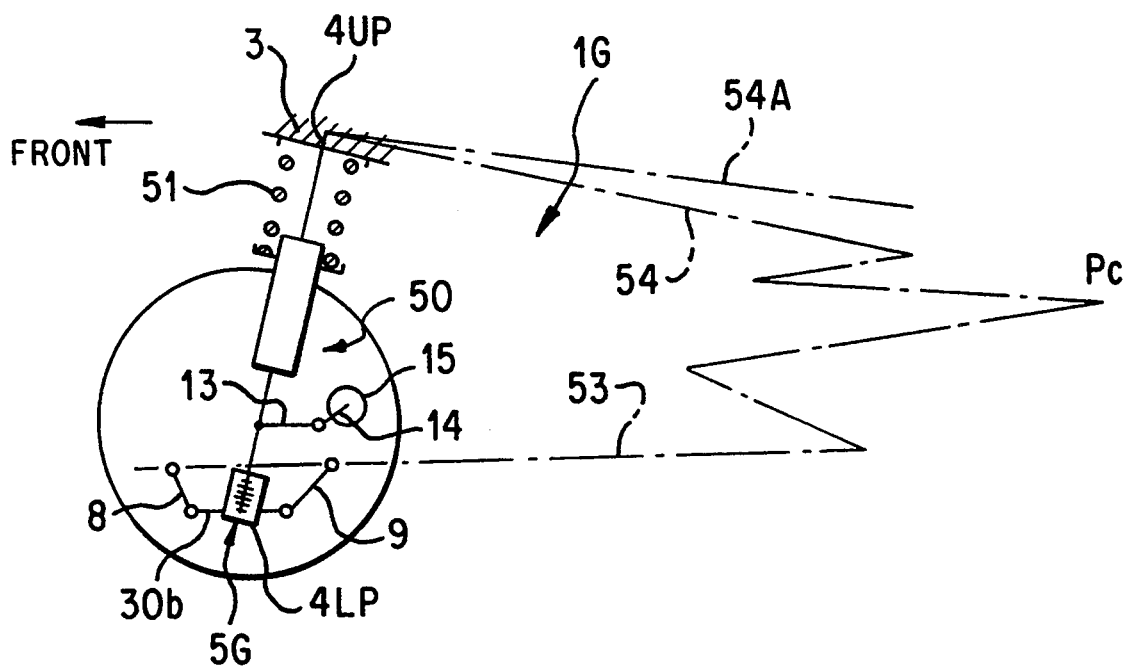
FIG. 14 is a schematic illustration of a suspension link mechanism of a suspension system in accordance with another preferred embodiment of the present invention.

Referring to FIG. 14, which shows a strut type suspension system in accordance with the preferred embodiment of the present invention, a suspension link mechanism 1G includes a strut 50 which is connected at its upper end to the vehicle body 3 through a suspension spring 51 and at its lower end to a wheel support member or wheel support member 4 by means of an adjusting means 5G, which is comprised of a screw link mechanism. Further, the suspension link mechanism 1G includes front and rear lower lateral kinks 8 and 9 which are connected to the adjusting means 5G through a lower pivot arm 30b and extend transversely inward. The wheel support member 4 is linked through a tie rod 13 to a steering link 14 assisted by a power cylinder 15.

This adjusting means 5G adjust the effective height of the strut 50, which is defined by a distance between connection points 4UP and 4LP at which the strut 50 is connected to the vehicle body 3 and the wheel support member 4, respectively), so as to displace up and down the front wheel instantaneous center Pc of the front wheel 2. In this instance, the front wheel instantaneous center Pc is defined as a point of intersection of a straight line 53 passing through connection points of the front and rear lateral link levers 8 and 9 to the vehicle body 3 and a straight line 54 perpendicularly passing the connection point 4UP of the strut 50 to the vehicle body 3.

Specifically. when the front wheels 2 is steered, the suspension link mechanism 1G of the front wheel 2, in an outside path, causes the adjusting means 5G to increase the effective height of the strut 50, thereby pulling up the front wheel instantaneous center Pc. On the other hand, the suspension link mechanism 1G of the front wheel 2 in an inside path causes the adjusting means 5G so as to decrease the effective height of the strut 50, thereby depressing down the front wheel instantaneous center Pc. With this suspension link mechanism 1G, the depression of the instantaneous center Pco of the front wheel 2 in the outside path is suppressed according to steered angles and simultaneously, the pulling up of the instantaneous center Pci of the front wheel 2 in the inside path is suppressed according to steered angles. Accordingly, the instantaneous centers Pco and Pci of the front wheels 2 are practically kept at substantially constant vertical heights from the ground.

Figure 15:
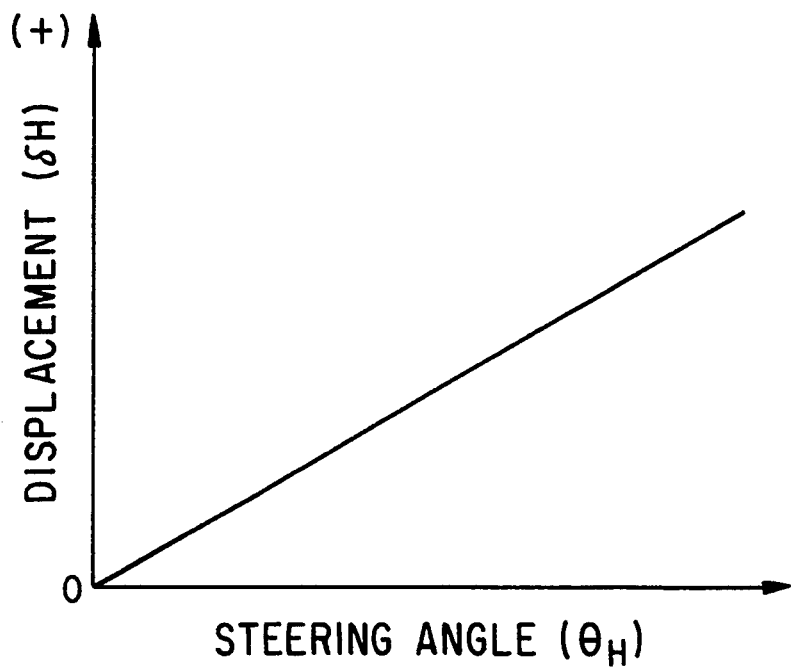
FIG. 15 is a graph showing the displacement of instantaneous center with respect to steering angle for the suspension system shown in FIGS. 3 through 14.
Figure 16:
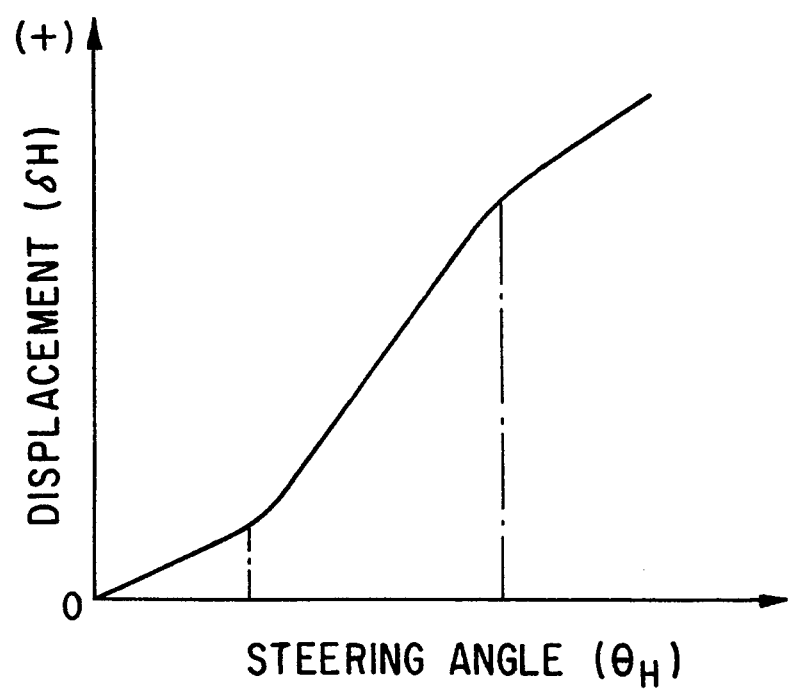
FIG. 16 is a graph showing a variation of the displacement of instantaneous center with respect to steering angle for the suspension system shown in FIGS. 3 through 14.

A comprehensive description of the property of adjustment of a front wheel instantaneous center relative to the suspension systems previously described will be hereafter provided with reference to FIGS. 15 and 16.

Generally, in order to secure the stability of driving or handling and the comfort of ride during straight ahead driving, in particular, at high speeds, and in order to provide a high caster against bump during a turn, suspension geometries are established so as to set the instantaneous centers of front wheels relatively low in vertical position. However, such a suspension geometry provides a linear down displacement of the front wheel instantaneous center according to bumps of the front wheel.

In contradistinction, the suspension system of the present invention, which has the adjusting means 5, 5A-5G, controls or suppresses the down displacement of the instantaneous center Pco of a front wheel in an outside path and the upward displacement of the instantaneous center Pci of a front wheel in an inside path according to steered angles, so as to keep the instantaneous centers Pco and Pci of the front wheels substantially unchanged during a turn. Consequently, as described previously, the suspension system of the present invention controls an increase in pitching moment, so as to improve the properties of anti-diagonal rolling, anti-dive and anti-squat, thereby providing a high stability of driving or handling and a high comfort of ride during a turn, in particular, with the smallest limit radius.

In any suspension system described above in which the instantaneous centers Pco and Pci of the front wheels 2 are established in lower positions from the ground, the displacement property of an instantaneous center Pco of a front wheel in an outside path, with respect to an instantaneous center Pco of the front wheel in a static state of the vehicle, are established as follows. Because the displacement properties of front wheel instantaneous centers are inversely related between a front wheel in an outside path and a front wheel in inside path, the following description will be directed to a front wheel in an outside path.

As shown in FIG. 15, in which a characteristic curve of the displacement $\delta H$ of the outside wheel instantaneous center Pco is depicted for a certain steering angle only by way of example, the displacement $\delta H$ of the outside wheel instantaneous center Pco may be established so as to linearly increase with an increase in steered angle.

Otherwise, as shown in FIG. 16, a non-linear displacement $\delta H$ of the outside wheel instantaneous center Pco may be established such that the gradation of displacement $\delta H$, or the rate of change in displacement $\delta H$, of the outside wheel instantaneous center Pco is small in a range of small steering angles, large in a range of middle steering angles, and smaller in a range of large steering angles than in the middle steering angle range. This is due to the nature of rolling moment and pitching moment, both of which increase with an increase in centrifugal force developed by the vehicle. That is, although the vehicle develops in a range of small steering angles only a small centrifugal force which in turn produces a rolling moment and a pitching moment on the vehicle, however, the centrifugal force is sharply increased with an increase in steering angle in a range of middle steering angles so as to produce a large rolling moment and a large pitching moment. Consequently, the vehicle is subjected to large bumps, so as to cause a rapid down displacement of the outside wheel instantaneous center Pco. In order to cancel such a rapid down displacement of the outside wheel instantaneous center Pco and thereby to secure the stability of vehicle attitude, i.e. the property of anti-diagonal rolling and anti-diving of the vehicle body, the gradation of displacement $\delta H$ of the outside wheel instantaneous center Pco is established to be small in the middle steering angle range.

In the large steering angle range, like in the middle steering angle range, the vehicle has a strong tendency of down displacement of the outside wheel instantaneous center Pco. However, in order to realize large caster angles against bumps by depressing the pre-established property of caster in some degree and an under steering effect by providing an increase in steering force, i.e. to secure a necessary self-aligning torque and the way the car handles during a turn, the gradation of displacement $\delta H$ of the outside wheel instantaneous center Pco is established somewhat less steep in the large steering angle range as compared with in the middle steering angle range.

Further, various non-linear displacement $\delta H$ of the outside wheel instantaneous center Pco may be established according to features of driving characteristics.

Figure 17:
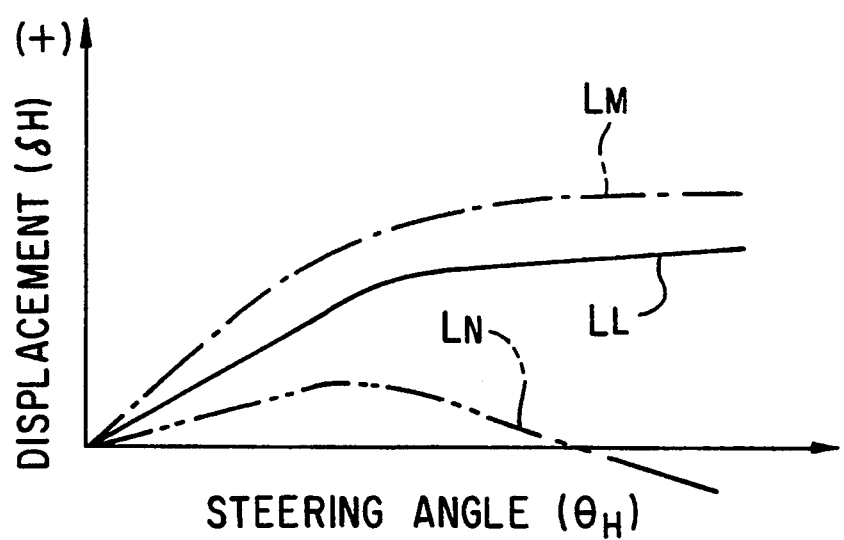
FIG. 17 is a graph showing other variation of the displacement of instantaneous center with respect to steering angle for the suspension system shown in FIGS. 3 through 14.

For example, in order to improve the stability of driving in addition to the stability of vehicle attitude, the gradation of displacement $\delta H$ of the outside wheel instantaneous center Pco is preferably established so as to change gradually at a relatively high rate in a range of smaller steering angles and at a relatively low rate in a range of larger steering angles as shown by a curve LL in FIG. 17, in which characteristic curves are depicted as to a certain steering angle only by way of example. This gradual change in the gradation of displacement $\delta H$ of the outside wheel instantaneous center Pco enables to provide a large caster angle in higher steering angle range so as to improve the stability of driving during a turn as well as a sharp improvement of the stability of vehicle attitude, i.e. the property of anti-diving and anti-diagonal rolling, at high speed in the smaller steering angle range.

Otherwise, in this instance, as shown by a curve LM in FIG. 17, the gradation of displacement $\delta H$ of the outside wheel instantaneous center Pco may be modified so as to gradually decline corresponding to increasing change in steering angle from smaller angles to larger angles. This modification enables, in addition to providing the improved stability of vehicle attitude during a turn, to establish appropriate gradations of displacement $\delta H$ of the outside wheel instantaneous center Pco meeting high speed, small steering driving, middle speed winding, and low speed, large steering driving.

For vehicles which are of the front engine-rear drive type which have a tendency of oversteering, as shown by a curve LN in FIG. 17, the gradation of displacement δH of the outside wheel instantaneous center Pco is preferred to be established such that the gradation of displacement δH of the outside wheel instantaneous center Pco is positive in a range of smaller steering angles and negative in a range of larger steering angles. In this instance, in addition to a sharp improvement of the stability of vehicle attitude, i.e. the property of anti-diving and anti-diagonal rolling, at high speed in the smaller steering angle range, a large caster angle is quickly developed during turns at larger steering angles.

With the suspension system whose geometry has been established to have the instantaneous centers Pco and Pci of the front wheels 2 in relatively lower positions from the ground, because the height of the instantaneous center Pco of the front wheel 2 in an outside path from the ground is increasingly changed with an increase in the degree of turn, a downward displacement of the instantaneous center Pco of the outside front wheel 2, which is primarily caused by turning, is substantially declined, so as to provide an improved stability of vehicle attitude. Furthermore, because the gradation of the instantaneous center Pco of the outside front wheel 2 is larger in the smaller steering angle range than in the larger steering angle range, the stability of driving for turns is improved along with a sharp improvement of the stability of vehicle attitude, i.e. the property of anti-diving and anti-diagonal rolling, at high speed in the smaller steering angle range.

Since the adjusting means 5, which differently operates according to the degrees of turn, does not acts against ordinary bumps and rebounds caused during straight ahead driving, the stability of driving, in particular, at high speeds, which the suspension geometry has been designed to provide, is maintained without being affected by bumps and rebounds due to unevenness or irregularities of the road surface.

Figure 18:
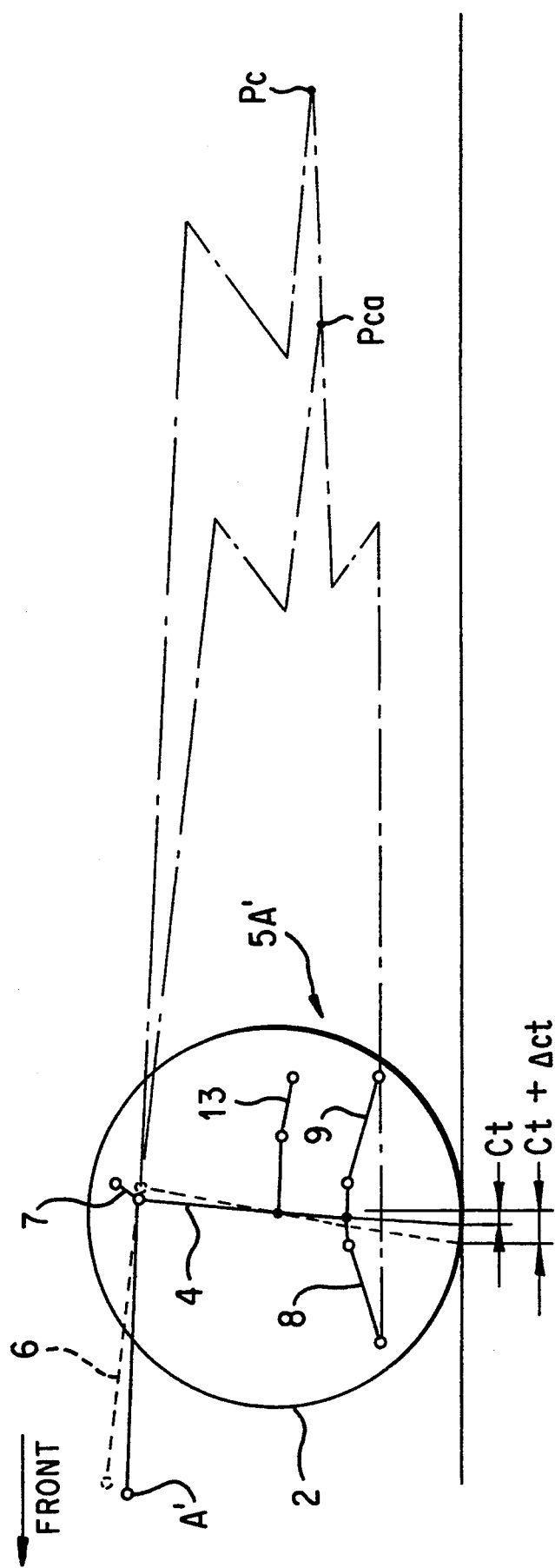
FIG. 18 is a schematic illustration showing a motion of the instantaneous center of a wheel, related to steering, which is provided by a suspension link mechanism of a suspension system in accordance with a preferred embodiment of the present invention.
Figure 19:
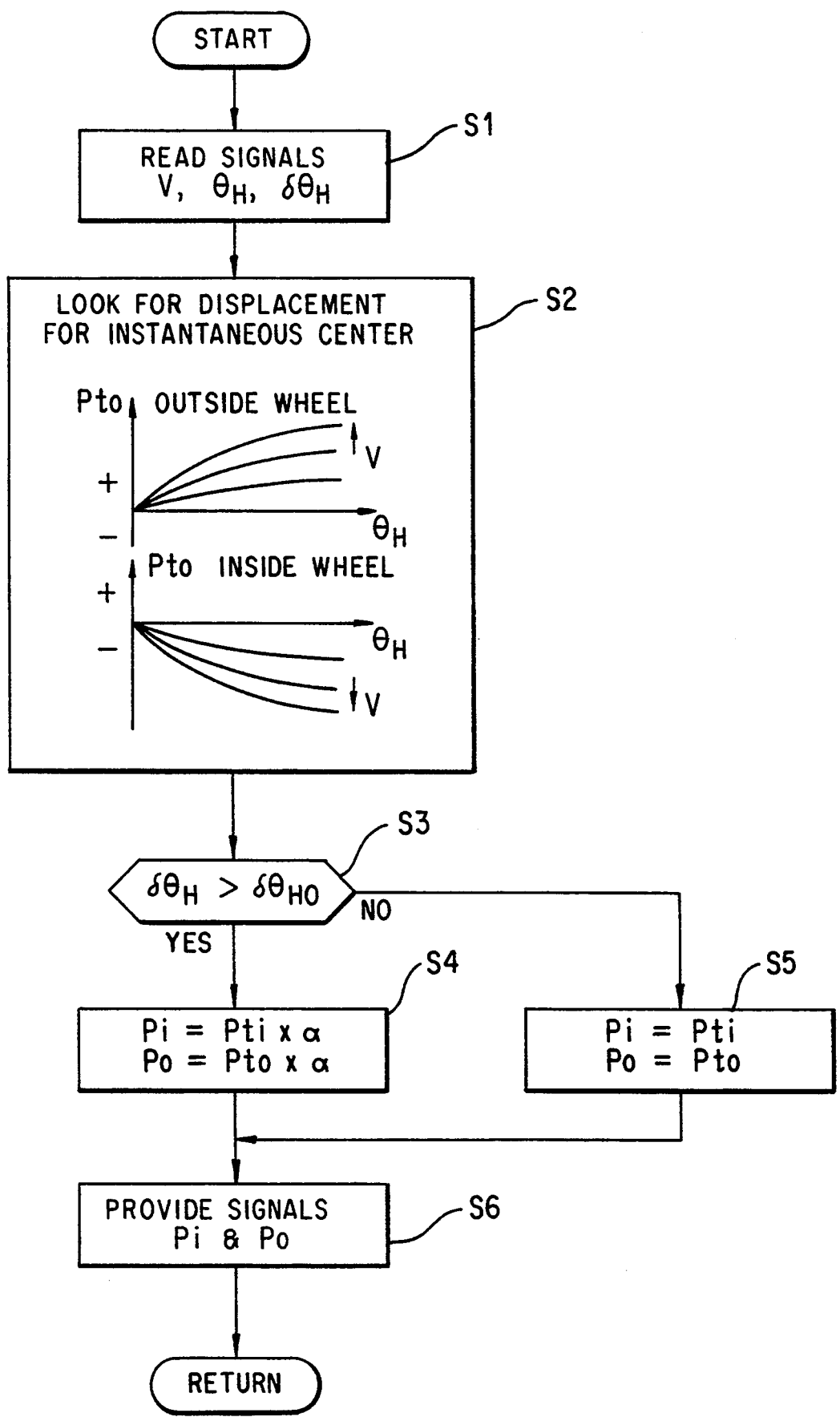
FIG. 19 is a flow chart illustrating the instantaneous center height adjusting control routine which the suspension mechanism of FIG. 18 executes.
Figure 20:
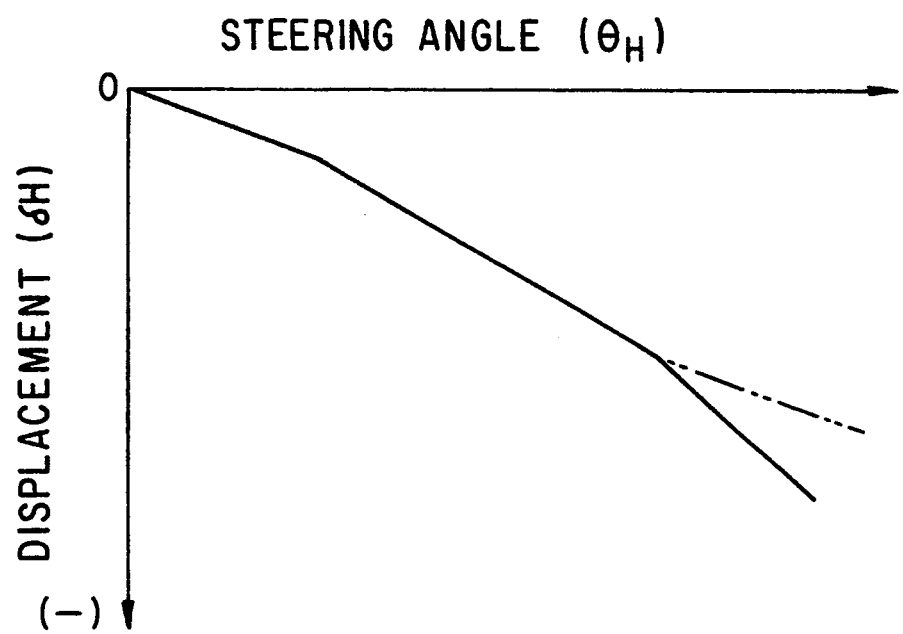
FIG. 20 is a graph showing the displacement of instantaneous center with respect to steering angle for the suspension system shown in FIG. 18.

Referring to FIGS. 18 through 20, a suspension system is shwn in accordance with another preferred embodiment of the present invention, which is the same in mechanical structure as that shown in FIG. 3, excepting that the suspension geometry adopts instantaneous centers Pco and Pci of the front wheels established in relatively high positions from the ground.

Referring to FIG. 18, in conjunction with FIG. 3, in a suspension link mechanism 5A' of the suspension system, a forward linking point A' of an upper trailing link lever 6 is moved slantwise upward and rearward, and downward and forward by means of an adjusting means 5A' through a bell crank lever 10. The suspension geometry of the suspension system also adopts a front wheel camber to the ground of zero while the vehicle is traveling, a height of the center of rolling such that it realizes a smallest change in the front wheel camber to the vehicle body 3 for ordinary bumps caused while the vehicle is traveling, and a height of the instantaneous center of the front wheel from the ground such that it is considerably larger than an ordinary height for the purpose of enhanced anti-diving effects and the stability of vehicle attitude while the vehicle drives straight ahead.

According to this suspension geometry, in the actuator adjusting control routine for the micro-computer of the control means 12 illustrated by a flow chart shown in FIG. 19, displacement maps to be looked up at step S2' are differently established from those used in the actuator adjusting control routine shown in FIG. 5 for the suspension system shown in FIGS. 3 and 4. That is, a displacement map for a front wheel in an inside path is established such that, with an increase in steering angle ($\Theta_H$) and with an increase in vehicle speed (V), the vertical displacement (Pto) of the forward linking point A of the upper trailing link lever 6 is negatively increased, that is, the upper trailing link lever 6 is pulled down at the forward linking point A. On the other hand, a displacement map for a front wheel in an outside path is established such that, with an increase in steering angle ($\Theta_H$) and with an increase in vehicle speed (V), the vertical displacement (Pto) of the forward linking point A of the upper trailing link lever 6 is positively increased, that is, the upper trailing link lever 6 is lifted up at the forward linking point A.

This is because, as explained with respect to the prior art shown in FIG. 1, when the front wheel 2 in the outside path is subjected to bump while the wheels turn around a corner, the instantaneous center Pc of the front wheel 2 is pulled down from the point it occupies while the vehicle travels straight ahead without any bump. However, since the suspension system of this embodiment is designed to position the instantaneous center Pc of the front wheel 2 at a considerably high point for enhancing greatly an anti-diving effect so as to provide an improved stability of attitude of the vehicle, it is difficult to provide the effect of a large caster angle only by a depression of the instantaneous center Pc of the front wheel 2 due to bumps during a turn.

On the basis of the nature that a backward and upward displacement of the upper trailing link lever 6 at the forward linking point A produces a force which forces a downward displacement of the instantaneous center Pc of the front wheel 2 as shown in FIG. 17, the instantaneous center Pc of the front wheel 2 in the outside path is forceably pulled or displaced downward by compelling the upper trailing link lever 6 to displace or lift backward and upward at the forward linking point A with the adjusting means 5A' so as to increase the caster angle, and hence the caster trail from Ct to Ct+Δct, i.e. to realize the effect of a large caster angle upon a occurrence of bumps during a turn, attributive to which the stability of driving or handling is secured even during a turn. On the other hand, the front wheel 2 is completely reversed in action when it is in the inside path to when it is in the outside path, the down displacement of the instantaneous center Pc of the front wheel 2 in the inside path is restrained by forcing the upper trailing link lever 6 to displace downward at the forward linking point A.

Further, since, with increases in steering angle ($\Theta_H$) and vehicle speed (V), an external force, which exerts on the vehicle body during a turn, increases proportionally to a steering angle ($\Theta_H$) and the square of a vehicle sped (V), the displacement maps are provided as shown in FIG. 19.

As shown in FIG. 20, the displacement δH of the outside wheel instantaneous center Pco is established so as to nonlinearly change according to steered angles such that the gradation of displacement δH, or the rate of change in displacement δH, of the outside wheel instantaneous center Pco, which is negative, is larger in a range of middle steering angles than in a range of smaller steering angles, and larger in the middle steering angle range than in a range of larger steering angles. This is, because the vehicle runs approximately straight ahead at, sometimes, high speeds in the smaller steering angle range, the gradation of displacement δH of the outside wheel instantaneous center Pco is established to be gentle so as to control the adjusting means 5A' to prevent the suspension system from harming the property of anti-diving, thereby securing the stability of vehicle attitude. From the standpoint of the importance of caster angle during a turn at high speeds, the gradation of displacement δH of the outside wheel instantaneous center Pco is established to be steep so as to provide high caster angles in the middle steering angle range, and it is established to be more steep so as to provide even greater caster angles, in particular, in the large steering angle range. This steep gradation of displacement δH of the outside wheel instantaneous center Pco in the large steering angle range can provide a tendency to understeer a vehicle, such as a front engine-front drive vehicle, which primarily has a tendency to understeer. However, as to vehicles which have a strong tendency to understeer, the gradation of displacement δH of the outside wheel instantaneous center Pco is preferred to be less steep in the large steering angle range than in the middle steering angle range so as to prevent understeering in excess.

With the suspension system whose geometry has been established to have the instantaneous centers Pco and Pci of the front wheels 2 in high positions so as to enhance the stability of vehicle attitude, such as the property of anti-dive, because the instantaneous center Pco of the front wheel 2 in an outside path is largely displaced downward with an increase in the degree of turn so as to provide an increased caster angle, the tendency to understeer is enhanced by means of an increase in a self-aligning torque and steering force, so as thereby to provides the stability of driving or handling for turns, in particular, with marginal turning radii.

Since the adjusting means 5A', which operates differently according to the degrees of turn, does not act against ordinary bumps and rebounds caused during straight ahead driving, the stability of driving, in particular, at high speeds which the suspension geometry has been designed to provide is maintained without being effected by bumps and rebounds due to unevenness or irregularities of the road surface. Furthermore, since a large caster angle during a turn is realized by means of the adjusting means 5A', the suspension system can utilize the geometry which allows to place instantaneous centers of a front wheels in high positions from the ground, so as to provide a high efficiency of anti-dive and a high stability of vehicle attitude during straight ahead driving.

Further, various non-linear displacement δH of the outside wheel instantaneous center Pco may be established according to features of driving characteristics.

Figure 21:
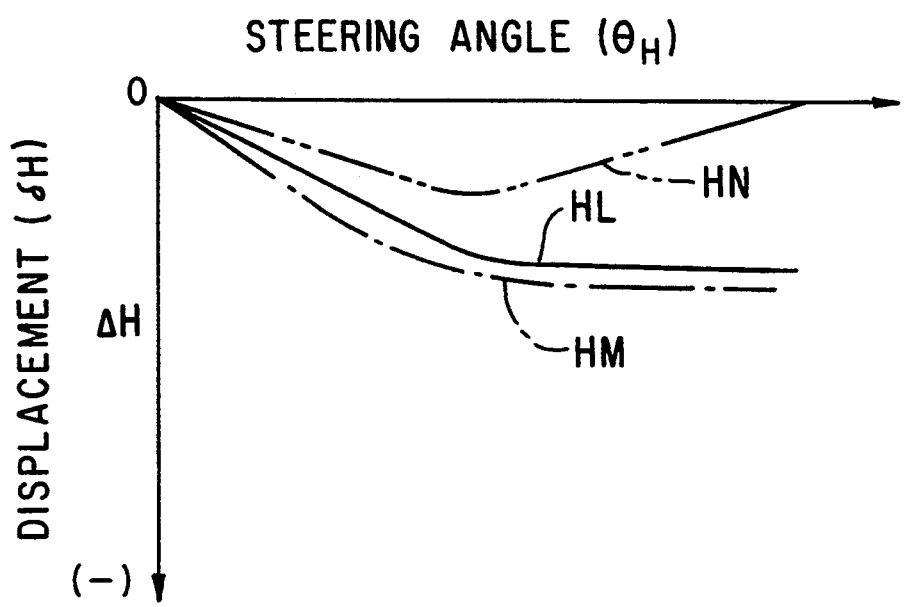
FIG. 21 is a graph showing a variation of the displacement of instantaneous center with respect to steering angle for the suspension system shown in FIG. 18.

Referring to FIG. 21, which shows characteristic curves of the displacement δH of the outside wheel instantaneous center Pco relative to steering angle ($\Theta_H$) are depicted as to a certain steering angle by way of example, the gradation of the displacement δH of the outside wheel instantaneous center Pco is preferably established so as to change gradually at a relatively high rate in a range of smaller steering angles and at a relatively low rate in a range of larger steering angles as shown by a characteristic curve HL. Because of the considerably high position of the outside wheel instantaneous center Pco from the ground, in order to secure the stability of driving by quickly lowering the outside wheel instantaneous center Pco in position so as to provide an increased caster angle, a large gradation of the displacement δH of the outside wheel instantaneous center Pco is established for the smaller steering angle range. On the other hand, in the larger steering angle range, the gradation of the displacement δH of the outside wheel instantaneous center Pco is established to be smaller so as to decline an decrease in the height of the outside wheel instantaneous center Pco in excess, thereby securing a certain degree of the stability of vehicle attitude.

Otherwise, as shown by a characteristic curve HM, the gradation of the displacement δH of the outside wheel instantaneous center Pco may be modified so as to gradually decline corresponding to an increasing change in steering angle from smaller angles to larger angles. This modification enables to establish appropriate gradations of displacement δH of the outside wheel instantaneous center Pco meeting small steering driving at high speeds, middle speed winding, and large steering driving at low speeds.

As shown by a characteristic curve HN, the gradation of displacement δH of the outside wheel instantaneous center Pco is preferred to be established such that the gradation of displacement δH of the outside wheel instantaneous center Pco is negative in a range of smaller steering angles and positive in a range of larger steering angles. In this instance, in addition to a sharp improvement of the stability of vehicle attitude, a large caster angle is quickly developed during turns at larger steering angles, so as to secure the stability of driving. Furthermore, if the vehicle is of the type having a strong tendency of understeering, such as front engine-front drive vehicles, a tendency of excessive understeering is suppressed.

It is also to be understood that although the present invention has been described in detail with respect to a preferred embodiment thereof, various other embodiments and variants may occur to those skilled in the art which do not depart from the scope and spirit of the invention. Such other embodiments and variants are deemed to fall within and are intended to be covered by the following claims.

What is claimed is:

1. A suspension system for a wheel, related to a steering system of an automobile, which is supported for rotation by a wheel support member, said suspension system comprising:

link means, disposed between said wheel support and a body of an automobile, for suspending said wheel support from said automobile body for enabling said wheel to swing about a center axis relative to said vehicle body; and adjusting means for causing said link means to change a height of an instantaneous center of a swing of said wheel relative to the ground according to degrees of turn of said automobile so as to maintain a height of an instantaneous center axis of swing at a substantially fixed height from the ground.

2. A suspension system as defined in claim 1, and further comprising an angle sensor for detecting a steered angle of a steering wheel of said automobile as said degree of turn.

3. A suspension system as defined in claim 1, wherein said adjusting means includes a speed sensor for detecting a lateral acceleration of said automobile as said degree of turn.

4. A suspension system as defined in claim 1, wherein said adjusting means includes an angle sensor for detecting a steered angle of a steering wheel of said automobile as one of parameters of said degree of turn and a speed sensor for detecting a speed of said automobile as another one of said parameters of said degree of turn.

5. A suspension system as defined in claim 1, wherein said link means includes a trailing link lever, extending in a lengthwise direction of said automobile body and connected at one end to said wheel support member and mounted at its other end to said automobile body, and said actuating means includes an electrically operated actuator, connected between said other end of said trailing link lever and said vehicle body, for displacing up and down said trailing link lever at said other end so as to change a height of said swing center from the ground according to degrees of turn of said automobile.

6. A suspension system as defined in claim 5, wherein said actuating means further includes an angle sensor for detecting a steered angle of a steering wheel of said automobile as said degree of turn.

7. A suspension system as defined in claim 1, wherein said link means includes lateral link lever means, extending in a transverse direction of said automobile body and connected at one end to said wheel support member and mounted at its other end to said automobile body, and said actuating means includes an electrically operated actuator, connected between said other end of said lateral link lever means and said vehicle body, for displacing up and down said lateral link lever means at said other end so as to change a height of said swing center relative to the ground according to degrees of turn of said automobile.

8. A suspension system as defined in claim 7, wherein said actuating means further includes an angle sensor for detecting a steered angle of a steering wheel of said automobile as said degree of turn.

9. A suspension system as defined in claim 8, wherein said lateral link lever means comprises a pair of lateral link levers and a pivot arm by means of which said pair of lateral link levers are connected at one ends thereof to said wheel support member.

10. A suspension system as defined in claim 9, wherein each lateral link lever is connected directly to said vehicle body.

11. A suspension system as defined in claim 9, wherein said link means includes a strut, connected between said wheel support member and said vehicle body, and lateral link lever means, extending in a transverse direction of said automobile body and connected at one end to said wheel support member and at another end to said automobile body, and said actuating means includes a mechanical actuator, connected between said wheel support member and said strut, for expanding and contracting said strut so as to change a height of said swing center relative to the ground according to degrees of turn of said automobile.

12. A suspension system as defined in claim 11, wherein said mechanical actuator comprises a screw mechanism.

13. A suspension system for a wheel, related to a steering system of an automobile, which is supported for rotation by a wheel support member, a suspension geometry of said suspension system being sized to have a center axis of a swing of said wheel located in a considerably low position relative to the ground for a straight ahead driving, said suspension system comprising:

link means, disposed between each said wheel support and said automobile body, for suspending said wheel support member from said automobile body so as to allow said wheel to swing about said center axis relative to an automobile body; and adjusting means for causing said link mechanism to provide an upward displacement of an instantaneous center axis of a swing of said wheel relative to the ground according to an increase in the degree of turn of said automobile when said wheel is in an outside path of turn and a downward displacement of said instantaneous center axis of a swing of said wheel from the ground according to an increase in the degree of turn of said automobile when said wheel is in an inside path of turn.

14. A suspension system as defined in claim 13, wherein said upward displacement and said downward displacement increase linearly with said increase in the degree of turn of said automobile.

15. A suspension system as defined in claim 13, wherein said upward displacement and said downward displacement increase linearly, with said increase in the degree of turn of said automobile, at a gradation which is larger a range of middle degrees of turn than in a range of small degrees of turn and smaller in a range of larger degrees of turn than in said middle degree turn range.

16. A suspension system as defined in claim 13, wherein said upward displacement and said downward displacement increase, with said increase in the degree of turn of said automobile, at a gradation which changes at a rate in a range of smaller degrees of turn and at a smaller rate in a range of larger degrees of turn than in said smaller degree turn range.

17. A suspension system as defined in claim 13, wherein said upward displacement and said downward displacement increase, with said increase in the degree of turn of said automobile, at a gradation which gradually declines with said increase in the degree of turn of said automobile.

18. A suspension system as defined in claim 13, wherein said upward displacement and said downward displacement increase, with said increase in the degree of turn of said automobile, at a positive gradation in a range of smaller degrees of turn and at a negative gradation in a range of larger degrees of turn.

19. A suspension system for a wheel, related to a steering system of an automobile, which is supported for rotation by a wheel support member, a suspension geometry of said suspension system being sized to have a center axis of a swing of said wheel located at a relatively high position relative to the ground more appropriate for a straight ahead driving, said suspension system comprising:

link means, disposed between each said wheel support and said automobile body, for suspending said wheel support member from said automobile body so as to allow said wheel to swing about said center axis relative to an automobile body; and adjusting means for causing said link mechanism to provide a downward displacement of an instantaneous center axis of a swing of said wheel relative to the ground according to an increase in the degree of turn of said automobile when said wheel is in an outside path of turn and an upward displacement of said instantaneous center axis of a swing of said wheel relative to the ground according to an increase in the degree of turn of said automobile when said wheel is in an inside path of turn.

20. A suspension system as defined in claim 19, wherein said downward displacement and said upward displacement increase linearly with said increase in the degree of turn of said automobile.

21. A suspension system as defined in claim 13, wherein said downward displacement and said upward displacement increase, with said increase in the degree of turn of said automobile, at a negative gradation which is smaller in a range of smaller degrees of turn than in a range of larger degrees of turn.

22. A suspension system as defined in claim 13, wherein said downward displacement and said upward displacement increase, with said increase in the degree of turn of said automobile, at a negative gradation which increases stepwise from a range of smaller degrees of turn toward a range of larger degrees of turn.

23. A suspension system as defined in claim 13, wherein said downward displacement and said upward displacement increase, with said increase in the degree of turn of said automobile, at a negative gradation which changes at a certain rate in a range of smaller degrees of turn and at a smaller rate in a range of larger degrees of turn than in said smaller degree turn range.

24. A suspension system as defined in claim 19, wherein said downward displacement and said upward displacement increase, with said increase in the degree of turn of said automobile, at a negative gradation which gradually declines from a range of smaller degrees of turn toward a range of larger degrees of turn.

25. A suspension system as defined in claim 19, wherein said downward displacement and said upward displacement increase, with said increase in the degree of turn of said automobile, at a gradation in a range of smaller degrees of turn and at a negative gradation in a range of larger degrees of turn.

* * * * *